United States Patent
Hong et al.

(10) Patent No.: US 7,206,052 B2
(45) Date of Patent: Apr. 17, 2007

(54) METHOD OF FABRICATING AN IN-PLANE SWITCHING MODE LIQUID CRYSTAL DISPLAY DEVICE FORMING A SECOND COMMON ELECTRODE OVER THE FIRST COMMON ELECTRODE AND PIXEL ELECTRODE ADJACENT TO THE DATA LINE

(75) Inventors: Hyung-Ki Hong, Seoul (KR); Jin-Youl Chung, Seoul (KR)

(73) Assignee: LG.Philips LCD Co., Ltd, Yoido-dong, Youngdungapo-ku, Seoul (KR)

( * ) Notice: Subject to any disclaimer, the term of this patent is extended or adjusted under 35 U.S.C. 154(b) by 82 days.

(21) Appl. No.: 11/012,321

(22) Filed: Dec. 16, 2004

(65) Prior Publication Data

US 2005/0093805 A1    May 5, 2005

Related U.S. Application Data

(63) Continuation of application No. 10/423,017, filed on Apr. 25, 2003, now Pat. No. 6,839,115.

(30) Foreign Application Priority Data

Oct. 4, 2002    (KR) ............................... 2002-60735

(51) Int. Cl.
    *G02F 1/1343*    (2006.01)
(52) U.S. Cl. .................. 349/141; 349/142; 349/143; 349/144; 349/146
(58) Field of Classification Search ................ 349/141
    See application file for complete search history.

(56) References Cited

U.S. PATENT DOCUMENTS 5,598,285 A    1/1997    Kondo et al. ................. 349/39

(Continued)

FOREIGN PATENT DOCUMENTS

JP    9005764    1/1997

(Continued)

OTHER PUBLICATIONS

Lee et al., "High-Transmittance, Wide-Viewing-Angle Nematic Liquid Crystal Display Controlled by Fringe-Field Switching", Asia Display '98, pp. 371-374.

(Continued)

*Primary Examiner*—David Nelms
*Assistant Examiner*—Lucy Chien
(74) *Attorney, Agent, or Firm*—McKenna Long & Aldridge LLP

(57) ABSTRACT

An in-plane switching mode liquid crystal display device includes a first substrate and a second substrate, gate lines and data lines arranged in a matrix form on the first substrate to define a pixel area, a thin film transistor at a cross portion of the gate and data lines, a common line and a pixel electrode line in the pixel area to define an upper pixel area portion and a lower pixel area portion, first common electrodes and pixel electrodes connected to the common line and the pixel electrode line, a second common electrode disposed to overlap one of the first common electrodes and one of the pixel electrodes adjacent to the data lines, the second common electrode being connected to the first common electrode, and a liquid crystal layer between the first and second substrates.

22 Claims, 6 Drawing Sheets

U.S. PATENT DOCUMENTS

| | | |
|---|---|---|
| 5,745,207 A | 4/1998 | Asada et al. ............... 349/141 |
| 5,805,247 A | 9/1998 | Oh-e et al. ................. 349/42 |
| 5,831,701 A | 11/1998 | Matsuyama et al. ........ 349/110 |
| 5,838,037 A | 11/1998 | Masutani et al. ........... 257/296 |
| 5,946,060 A | 8/1999 | Nishiki et al. .............. 349/48 |
| 5,990,987 A | 11/1999 | Tanaka ...................... 349/43 |
| 6,028,653 A | 2/2000 | Nishida ..................... 349/141 |
| 6,040,882 A | 3/2000 | Jun et al. |
| 6,040,887 A | 3/2000 | Matsuyama et al. ........ 349/141 |
| 6,097,454 A | 8/2000 | Zhang et al. ............... 349/43 |
| 6,259,502 B1 | 7/2001 | Komatsu .................... 349/141 |
| 6,266,166 B1 | 7/2001 | Katsumata et al. .......... 359/3 |
| 6,281,958 B1 | 8/2001 | Nakajima ................... 349/141 |
| 6,549,258 B1 | 4/2003 | Shin et al. .................. 349/141 |
| 6,697,141 B2 | 2/2004 | Yamakita et al. ........... 349/141 |
| 6,744,482 B2 | 6/2004 | Matsumoto et al. ........ 349/141 |
| 2001/0046019 A1 | 11/2001 | Lee et al. |
| 2002/0100602 A1 | 8/2002 | Shotey et al. ............... 174/67 |
| 2002/0158997 A1 | 10/2002 | Fukami et al. .............. 349/49 |
| 2002/0176043 A1 | 11/2002 | Fukami et al. .............. 349/141 |
| 2003/0081164 A1 | 5/2003 | Sato et al. .................. 349/141 |
| 2003/0086045 A1 | 5/2003 | Ono et al. .................. 349/141 |

FOREIGN PATENT DOCUMENTS

JP          9073101          3/1997

OTHER PUBLICATIONS

Matsumoto et al., "LP-A: Display Characteristics of In-Plane-Switching (IPS) LCDs and a Wide-Viewing-Angle 14.5in. IPS TFT-LCD", Euro Display '96, pp. 445-448.

Wakemoto et al., "An Advanced In-Plane-Switching Mode TFT-LCD", SID '97 Digest, pp. 929-932.

Kiefer et al., "P2-30 In-Plane Switching of Nematic Liquid Crystals", Japan Display '92, pp. 547-550.

Ohta et al., "S30-2 Development of Super-TFT-LCDs with In-Plane Switching Display Mode", Asia Display '95, pp. 707-710.

Oh-e et al., "S23-1 Principles and Characteristics of Electro-Optical Behaviour with In-Plane Switching Mode", Asia Display '95, pp. 577-580.

METHOD OF FABRICATING AN IN-PLANE SWITCHING MODE LIQUID CRYSTAL DISPLAY DEVICE FORMING A SECOND COMMON ELECTRODE OVER THE FIRST COMMON ELECTRODE AND PIXEL ELECTRODE ADJACENT TO THE DATA LINE

This application is a Continuation of copending U.S. patent application No. 10/423,017 filed on Apr. 25, 2003, now U.S. Pat. No. 6,839,115 and claims the benefit of Korean Application No. 2002-60735 filed in Korea on Oct. 4, 2002, both of which are hereby incorporated by reference.

BACKGROUND OF THE INVENTION

1. Field of the Invention

The present invention relates to a liquid crystal display (LCD) device, and particularly, to an in-plane switching mode LCD device.

2. Description of the Related Art

An LCD device of twisted nematic mode, which is mainly used in flat panel display devices having high image quality and low power consumption, has a narrow viewing angle. The refractive anisotropy of liquid crystal molecules together with the vertical orientation of the liquid crystal molecules with respect to the substrate when voltage is applied to a twisted nematic mode LCD device causes a narrow viewing angle. In contrast, an in-plane switching mode LCD has a wide viewing angle since the liquid crystal molecules are oriented in a direction parallel with the substrate when voltage is applied to an in-plane switching mode LCD device.

FIG. 1A is a plan view showing a unit pixel of a related art in-plane switching mode LCD. FIG. 1B is a cross-sectional view along line I–I' in FIG. 1A. As shown in FIG. 1A, gate lines 1 and data lines 3 are respectively arranged in longitudinal and transverse directions on a transparent first substrate 10 to define a unit pixel area. In an LCD device with a panel of unit pixels, n gate lines 1 and m data lines 3 are crossed to make a panel having n×m unit pixels.

In the unit pixel area, a thin film transistor 9 is formed adjacent to where the gate line 1 and the date line 3 cross each other. The thin film transistor 9 includes a gate electrode 1a, a source electrode 2a and a drain electrode 2b that are respectively connected to the gate line 1, the data line 3 and the pixel electrode 7. As shown in FIG. 1B, a gate insulating layer 8 is formed above the gate electrode 1a. A semiconductor layer 5 is formed above the gate insulating layer 8. The source electrode 2a and the drain electrode 2b are formed in contact with respective sides of the semiconductor layer 5.

A common line 4 is arranged to be parallel with the gate line 1 and traverses through the unit pixel area. As shown in FIG. 1A, the common electrode 6 and the pixel electrode 7 are arranged to be parallel with each other such that the orientation of the liquid crystal molecules can be changed. The common electrode 6 is formed simultaneously with the gate electrode 1a and connected to the common line 4. The pixel electrode 7 is formed simultaneously with the both source electrode 2a and drain electrode 2b such that the pixel electrode 7 is connected to the drain electrode 2b of the thin film transistor 9. A passivation layer 11 and then a first alignment layer 12a are formed over the first substrate 10, including the source/drain electrodes 2a and 2b.

As shown in FIG. 1B, a branch of the common electrode 6 is formed adjacent to the periphery of the unit pixel area to shield the pixel electrode 7 from the electric field generated between the pixel electrode 7 and the data line 3 on the periphery of the unit pixel area. Also, a pixel electrode line 14, which overlaps the common line 4, forms a storage capacitor using the gate insulating layer 8 between the pixel electrode line 14 and the common line 4 as the insulator of the storage capacitor. The width W of the common line 4 that traverses across the unit pixel area under the pixel electrode line 14 should be sufficiently large to ensure a sufficient storage capacitance for the time needs of the LCD device.

A second substrate 20 includes a black matrix 21, a color filter 23 and a second alignment layer 12b. In particular, light leakage from the unit pixel area is prevented by the black matrix 21 formed above the gate line 1, the data line 3 and the thin film transistor 9. A color filter 23 is formed adjacent to the black matrix 21 on the second substrate 20. A second alignment layer 12b is provided on the color filter 23. A liquid crystal layer 13 is provided between the first and second substrates 10 and 20.

When a voltage is not applied to the in-plane switching mode LCD device in FIGS. 1A and 1B, the liquid crystal molecules in the liquid crystal layer 13 are oriented in accordance with the alignment direction of the first and second alignment layers 12a and 12b. However, when a voltage is applied between the common electrode 6 and the pixel electrode 7, the liquid crystal molecules are reoriented to be parallel with the substrate and vertical to the extended direction of the common electrode 6 and the data line 3. Since the liquid crystal molecules in the liquid crystal layer 13 are always reoriented on the same plane, inversion of gray level is not generated in up-and-down and left-and-right viewing angle direction.

In the in-plane switching mode LCD device of FIGS. 1A and 1B, the common electrode 6 and the pixel electrode 7 may be formed of an opaque metal in the unit pixel area. The common electrode 6 should be formed adjacent to the periphery of the unit pixel area, and therefore, light-transmission regions of even numbers are created. For example, four light transmission areas are shown in FIG. 1. Accordingly, the aperture ratio is reduced. Further, even though the common electrode is adjacent to the periphery of the unit pixel area, there is a limit as to how much data voltage can be shield from the pixel electrode during driving.

SUMMARY OF THE INVENTION

Accordingly, the present invention is directed to a method for manufacturing an LCD device that substantially obviates one or more of the problems due to limitations and disadvantages of the related art.

An object of the present invention is to improve an aperture ratio of an LCD device.

Another object of the present invention is to improve the shielding of the pixel electrode from the data voltage.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the objects of the present invention, as embodied and broadly described herein, there is provided an in-plane switching mode liquid crystal display device including a first substrate and a second substrate, gate lines and data lines arranged in a matrix form on the first substrate to define a pixel area, a thin film transistor at a cross portion of the gate and data lines, a common line and a pixel electrode line in the pixel area to define an upper pixel area portion and a lower pixel area portion, first common electrodes and pixel electrodes connected to the common line and the pixel electrode line, a second common electrode disposed to overlap one of the first common electrodes and one of the pixel electrodes adjacent to the data lines, the second common electrode being connected to the first common electrode, and a liquid crystal layer between the first and second substrates.

In another aspect of the present invention, there is provided an in-plane switching mode liquid crystal display device including a first substrate and a second substrate, gate lines and data lines in a matrix form on the first substrate to define a pixel area, a thin film transistor at a cross portion of the gate and data lines, a common line and a pixel electrode line in the pixel area to define an upper pixel area portion and a lower pixel area portion, first common electrodes and pixel electrodes connected to the common line and the pixel electrode line, a passivation layer over the first substrate including the first common electrodes and the pixel electrodes, the passivation layer having a contact hole for exposing a part of the first common electrode, a second common electrode formed in the shape of an "H" on the passivation layer, the second common electrode being connected to the first common electrodes through the contact hole and overlapped with the first common electrodes adjacent to the data lines, and a liquid crystal layer between the first and second substrates.

In another aspect of the present invention, a fabrication method of an in-plane switching mode liquid crystal display device includes: forming a first common electrode, a gate electrode and a gate line on a first substrate; forming a gate insulating layer over the first substrate including the gate electrode; forming a semiconductor layer over the gate electrode; forming a source electrode, a drain electrode, and a pixel electrode on the semiconductor layer and a data line; forming a passivation layer over the first substrate; forming a contact hole in the passivation layer and the gate insulating layer to expose a part of the first common electrode; and forming a second common electrode on the passivation layer to be connected to the first common electrode through the contact hole.

In another aspect of the present invention, an in-plane switching mode liquid crystal display device includes: a first substrate and a second substrate; gate lines and data lines arranged in a matrix form on the first substrate to define a pixel area; a thin film transistor at a cross portion of the gate and data lines; a common line and a pixel electrode line in the pixel area to define an upper pixel area portion and a lower pixel area portion; common electrodes and pixel electrodes connected to the common line and the pixel electrode line, wherein some of the pixel electrodes and some of the first common electrodes overlap each other in the upper and lower pixel area portions at opposite corners of the pixel area adjacent to the data lines.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EXEMPLARY EMBODIMENTS

Reference will now be made in detail to the exemplary embodiments of the present invention, examples of which are illustrated in the accompanying drawings.

Figure 1A:
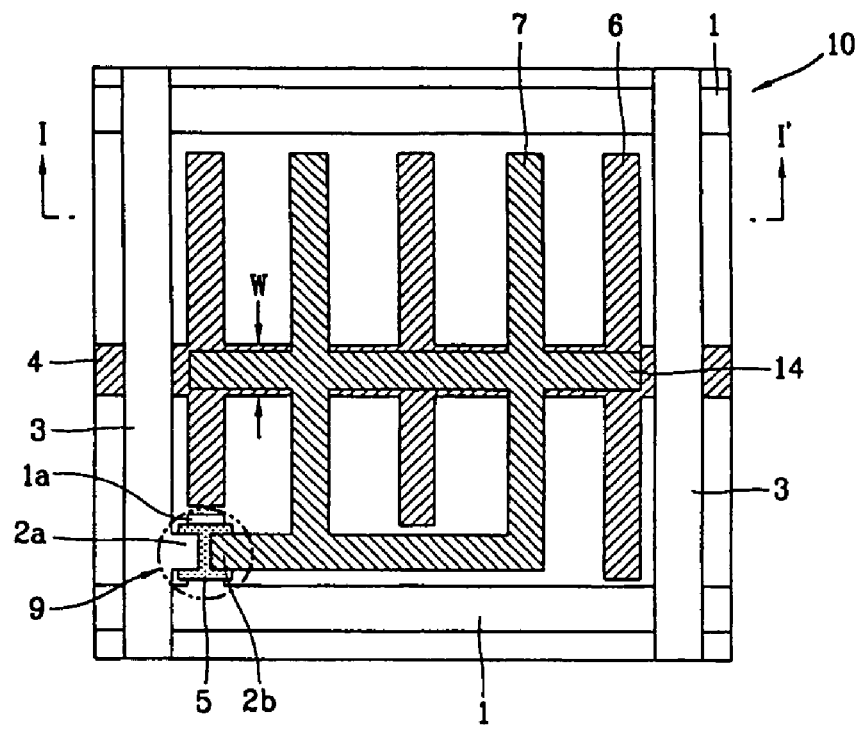
FIG. 1A is a plan view showing a unit pixel of a related art in-plane switching mode LCD.
Figure 1B:
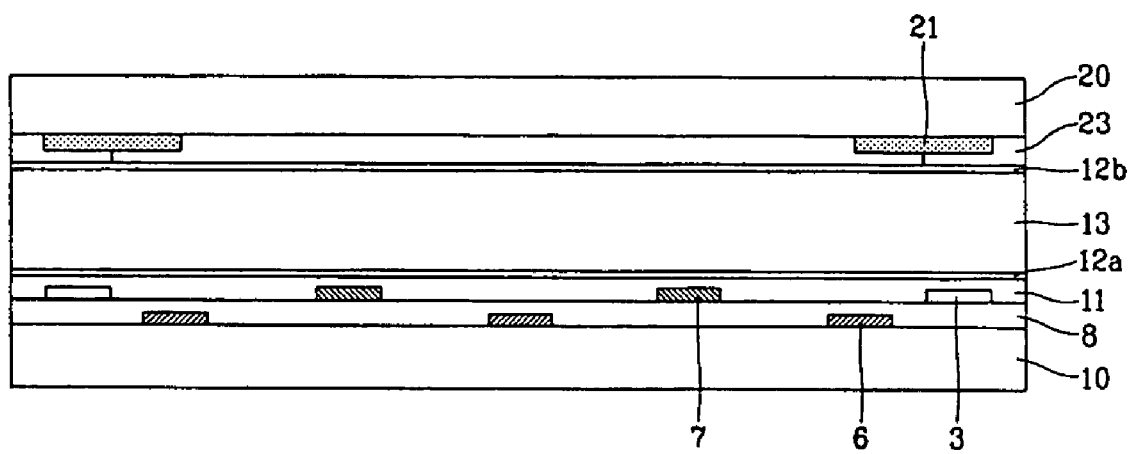
FIG. 1B is a cross-sectional view along line I–I' in FIG. 1A.
Figure 2A:
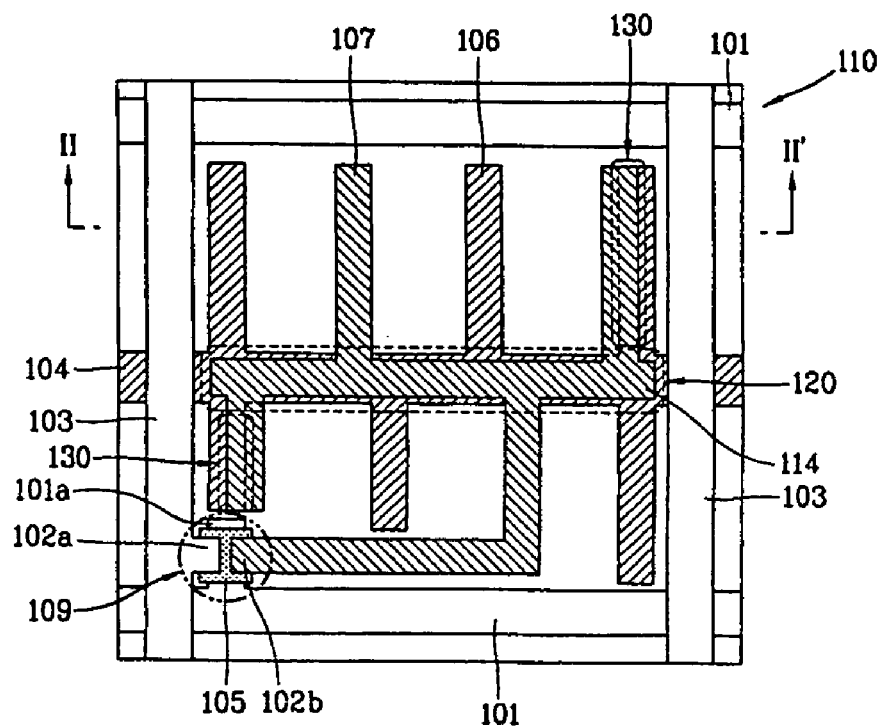
FIG. 2A is a plan view showing a unit pixel of an in-plane switching mode LCD device according to a first exemplary embodiment of the present invention.
Figure 2B:
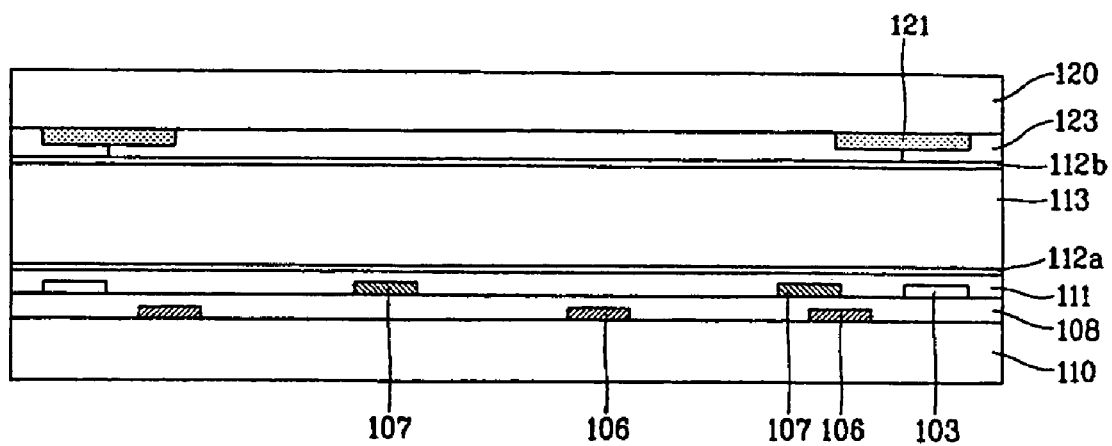
FIG. 2B is a cross-sectional view along line II–II' in FIG. 2A.

FIG. 2A is a plan view showing a unit pixel of an in-plane switching mode LCD in accordance with an exemplary embodiment of the present invention. FIG. 2B is a cross-sectional view along line II–II' in FIG. 2A. As shown in FIG. 2A, gate lines 101 and data lines 103 are respectively arranged in longitudinal and transverse directions on a transparent first substrate 110 to define a pixel area.

In the pixel area, a thin film transistor 109 is formed adjacent to where one of the gate lines 101 and one of the date lines 103 cross each other. The thin film transistor 109 includes a gate electrode 101a, a source electrode 102a and a drain electrode 102b that are respectively connected to one of the gate lines 101, one of the data lines 103 and to the pixel electrode 107. A gate insulating layer 108 is formed above the gate electrode 101a. A semiconductor layer 105 is formed above the gate insulating layer 108. The source electrode 102a and the drain electrode 102b are formed in contact with respective sides of the semiconductor layer 105.

A common line 104 is formed to traverse across a central portion of the pixel area and is in parallel with the gate lines 101. A pixel electrode line 114 is formed to traverse across a central portion of the pixel area and is in parallel with the gate lines 101. The common line 104 and the pixel electrode line 114 traversing across the pixel area split the pixel area into an upper pixel area portion and a lower pixel area portion. The pixel electrode line 114 and the common line 104 form a first overlapped portion 120 across a central portion of the pixel area. The pixel area also includes common electrodes 106, which are branches of the common line 104, and pixel electrodes 107, which are branches of the pixel electrode line 114. Some of the common electrodes 106 and some of the pixel electrodes 107 overlap one another in second overlapped portions 130 adjacent to the periphery of the pixel area and at opposite corners of the pixel area. The first and second overlapped portions 120 and 130 together with a gate insulating layer 108 form a storage capacitor. One of the pixel electrodes 107 connects the drain electrode 102b of the thin film transistor 109 to the pixel electrode line 114. At least some of the common electrodes 106 in the upper portion of the pixel area are not aligned with at least some of the common electrodes 106 in the lower portion of the pixel area. Further, at least some of the pixel electrodes 107 in the upper portion of the pixel area are not aligned with at least some of the pixel electrodes 107 in the lower portion of the pixel area.

As shown in FIG. 2B, the common electrodes 106 are formed on a first substrate 110 that is made of transparent material, such as the glass. A gate insulating layer 108 is provided over the common electrodes 106 and the first substrate 110. The pixel electrodes 107 and the data lines 103 are formed on the gate insulating layer 108. In addition, a passivation layer 111 is formed over the entire first substrate 110 including the pixel electrodes 107 and the data lines 103. A first alignment layer 112a is provided over the passivation layer 111.

As also shown in FIG. 2B, a second substrate 120 includes a black matrix 121, a color filter 123 and a second alignment layer 112b. In particular, light leakage from the pixel area is prevented by the black matrix 121 formed above the gate lines 1, the data lines 3 and the thin film transistor 109. The color filter 123 is formed on the black matrix 121 in the second substrate 120. A second alignment layer 112b is provided on the color filter 123. A liquid crystal layer 113 is provided between the first and second substrates 110 and 120.

As described above, some of the common electrodes 106 and the pixel electrodes 107 are formed to overlap each other adjacent to the data lines. Because of such an overlap, the aperture ratio can be improved. The common electrodes 106 overlapped by some of the pixel electrodes 107 shield the pixel electrode from the signals on the data lines 103. Further, if the common electrodes 106 overlapped by some of the pixel electrodes 107 are disposed to be closer to the most adjacent one of the data lines 103 than the pixel electrodes overlapping the common electrodes, the pixel electrodes 107 overlapping the common electrodes 106 can be essentially completely shielded from the data lines 103 by the electric field generated between the pixel electrodes 107 and the common electrodes 106. Accordingly, vertical cross talk generated by an electric field on one of the pixel electrodes 107 from one of the data lines 103 during driving can be prevented.

Figure 3A:
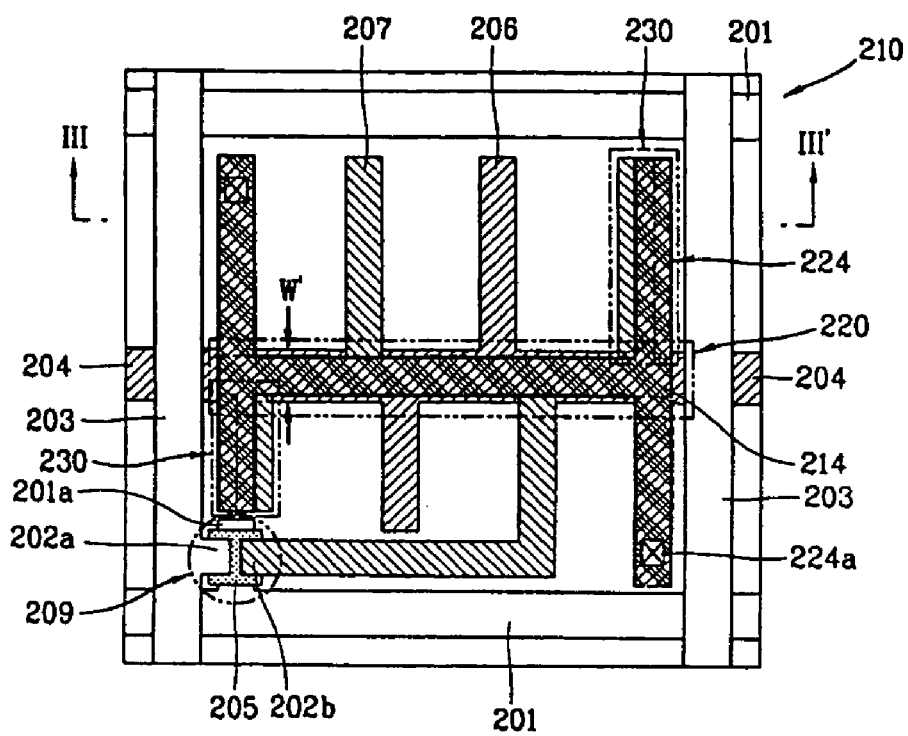
FIG. 3A is a plan view of a pixel area in an in-plane switching mode LCD device according to a second exemplary embodiment of the present invention.
Figure 3B:
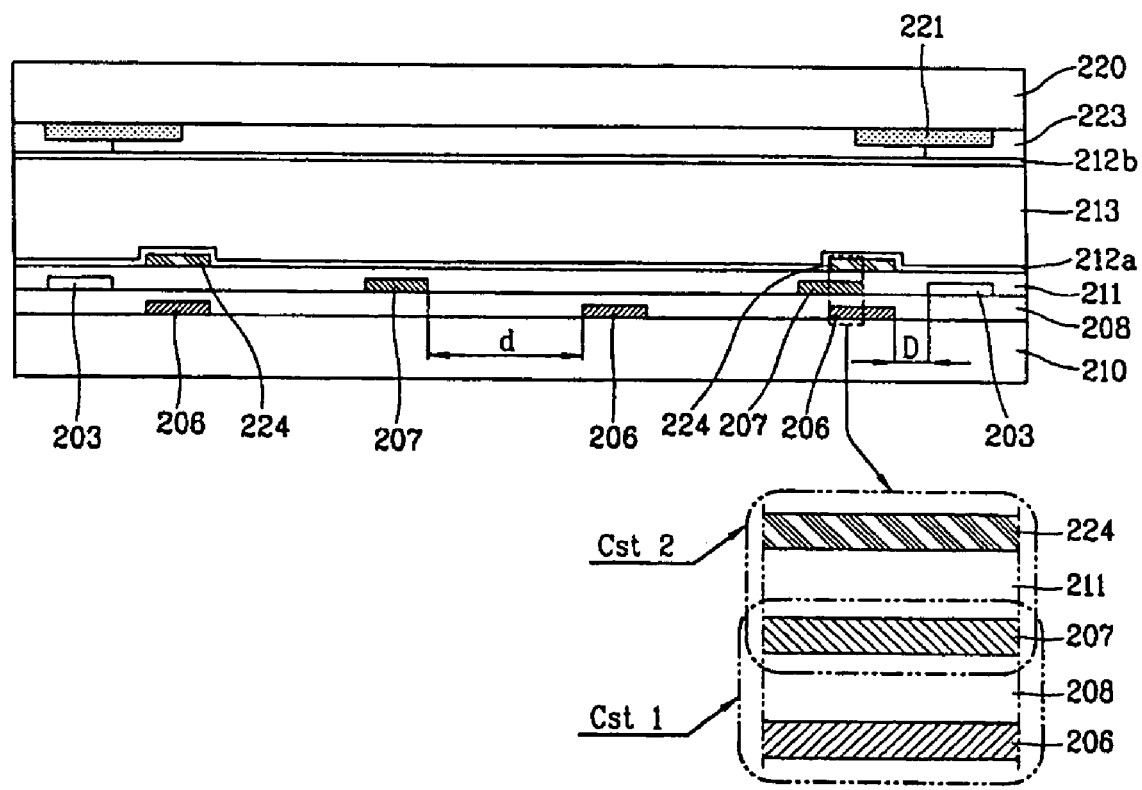
FIG. 3B is a cross-sectional view along line III–III' in FIG. 3A.

FIG. 3A is a plan view of a pixel area in an in-plane switching mode LCD device according to a second exemplary embodiment of the present invention. FIG. 3B is a cross-sectional view along line III–III' in FIG. 3A. As shown in FIG. 3A, an in-plane switching mode LCD device according to the second embodiment of the present invention comprises a thin film transistor 209 formed adjacent to where one of gate lines 201 and one of data line 203 cross each other. The thin film transistor 209 comprises a gate electrode 201a that protrudes from one of the gate lines 201, a semiconductor layer 205 formed over the gate electrode 201a, a source electrode 202a, which protrudes from one of the data lines 203, formed on an end of the semiconductor layer 205 and a drain electrode 202b formed on another end of the semiconductor layer 205.

A common line 204 is formed to traverse across a central portion of the pixel area and is in parallel with the gate lines 201. A pixel electrode line 214 is formed to traverse across a central portion of the pixel area and is in parallel with the gate lines 201. The common line 204 and the pixel electrode line 214 traversing across the pixel area split the pixel area into an upper pixel area portion and a lower pixel area portion. A width W' of the common line 204 is about 10~15 μm.

The pixel area also includes first common electrodes 206, which are branches of the common line 204, and pixel electrodes 207, which are branches of the pixel electrode line 214. Some of the pixel electrodes 207 overlap some of the first common electrodes 206 in peripheral regions of the pixel area adjacent to the data lines 203. One of the pixel electrodes 207 is connected to the drain electrode 202b of the thin film transistor 209. At least some of the first common electrodes 206 in the upper portion of the pixel area are not aligned with at least some of the first common electrodes 206 in a lower portion of the pixel area. Further, at least some of the pixel electrodes 207 in the upper portion of the pixel area are not aligned with at least some of the pixel electrodes 207 in the lower portion of the pixel area.

As shown in FIG. 3A, a second common electrode 224 is positioned to overlap some of the pixel electrodes 207 that overlap some of the first common electrodes 206. The second common electrode 224 has the shape of an "H" and is connected to the first common electrodes 206 through a contact hole 224a in the pixel area. In the alternative, the second common electrodes 224 can be connected to the first common electrodes 206 through a contact hole external to the pixel area. For example, the second common electrodes 224 can be connected to the first common electrodes 206 through a contact hole in the pad area. In another alternative, the second common electrodes 224 and the first common electrodes 206 can be connected to the same external potential. Together, the second common electrodes 224 and the first common electrodes 206, which are adjacent to the data lines 203, shield the pixel electrodes 207 from the effects of a data voltage on an adjacent one of the data lines 203.

The pixel electrode line 214 and the common line 204 form a first overlapped portion 220 across a central portion of the pixel area. Some of the pixel electrodes 207 overlapping some of the first common electrodes 206 in peripheral regions of the pixel area adjacent to the data lines 203 form second overlapped portions 230. The first overlapped portion 220 and second overlapped portions 230 together with a gate insulating layer 208 form a storage capacitor Cst1.

As shown in FIG. 3B, the first common electrode 206 is formed on the first substrate 210 made of transparent material, such as glass. Although not shown in FIG. 3B, the gate electrode 201a of the thin film transistor 209 is formed on the first substrate 210. The gate insulating layer 208 is formed over the entire first substrate 210 including the first common electrode 206. The pixel electrodes 207 is formed on the gate insulating layer 208 along with the data lines 203. Further, although not shown in FIG. 3B, a semiconductor layer 205 is formed on the gate insulating layer 208, and the source electrode 202a and the drain electrode 202b are formed on the semiconductor layer 205. A passivation layer 211 is formed over the entire first substrate 210 including the data lines 203 and the pixel electrodes 207. The second common electrode 224 is formed on the passivation layer 211. The distance D separating the overlapping first common electrode 206 and second common electrode 224 from an adjacent one of the data lines 203 is about 3~5 μm. A clearance d between one of first common electrodes 206 and one of the pixel electrodes 207 for generating a lateral electric field to display an image is about 16~20 μm. The values of the D and d above are exemplary values for a pixel are having 3-block lower and upper portions. The values for a 5-block and 7-block upper and lower pixel area can be different.

A black matrix 221 for preventing the light from leaking and color filters 223 for realizing the colors are formed on the second substrate 220 facing the first substrate 210. A second alignment layer 212b can be formed on the color filters 223. A liquid crystal layer 213 is formed between the first substrate 210 and the second substrate 220.

In the second exemplary embodiment of the present invention, as discussed above, a second common electrode 224 is formed in addition to the first common electrode 206 on the periphery of the pixel adjacent to the data lines 203. Accordingly, the pixel electrodes 207 adjacent to the data lines 203 can be essentially completely shielded from the data lines 203. That is, compared to the first exemplary embodiment shown in FIG. 2B, the second exemplary embodiment having a first common electrode 206 and a second common electrode 224 more thoroughly surrounds pixel electrodes 207 adjacent to the data lines 203. Therefore, the electric field generated between one of the data lines 203 and the pixel electrodes 207 adjacent to the data lines 203 can be further effectively blocked in the second exemplary embodiment of the present invention.

The second exemplary embodiment of the present invention as shown in FIG. 3B has more storage capacity in the storage capacitor than the first exemplary embodiment while maintaining the same amount of light transmission region. As shown in the expanded figure of FIG. 3B, the storage capacitor Cst is the sum of first storage capacitor Cst1, which is formed by the gate insulating layer 208 formed on lower portion of the pixel electrode 207 and the first common electrode 206, and second storage capacitor Cst2, which is formed by the passivation layer 211 formed on the upper portion of the pixel electrode 207 and the second common electrode 224. Because the first and second common electrodes 206 and 224 are connected through the contact hole 224a, the total storage capacitor Ctot becomes Cst1+Cst2. The storage capacitor formed in the first exemplary embodiment as shown in FIG. 2B is formed only by the first common electrodes 106 overlapped by the pixel electrode 107, and therefore, the storage capacity is Cst1. Therefore, the second exemplary embodiment of the present invention is able to improve the storage capacitor while having same aperture ratio as that of the first exemplary embodiment.

The storage capacitor prevents the voltage of the pixel electrode from being changed by charging the gate voltage during the gate signal is applied, and then by maintaining the charged voltage until the gate voltage is supplied to gate in the next frame. Therefore, as the storage capacitor is increased, flicker caused by the voltage change in the pixel electrode can be prevented more effectively. Also, since the storage capacitor is generated only by overlapping the common line and the pixel electrode line in the related art, the widths of the common line and the pixel electrode have to be set wide in order to set a desired storage capacitance. However, in the present invention, because of the increased storage capacitance, the widths of the common line and the pixel electrode line can be thinner such that the aperture ratio can be improved. For example, when the width of the common line is reduced from 15 μm to 10 μm, brightness can be improved by more than 2%.

Figure 4A:
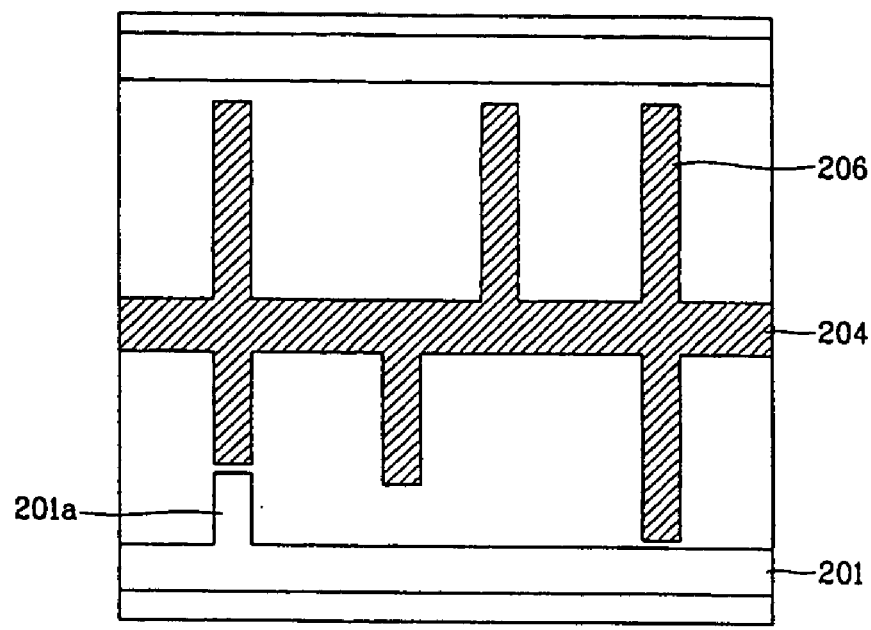
FIGS. 4A through 4E are processing views for describing a fabrication method of the in-plane switching mode LCD device according to the second exemplary embodiment of the present invention.

FIGS. 4A through 4E are processing views for describing a fabrication method of the in-plane switching mode LCD device according to the second exemplary embodiment of the present invention. As shown in FIG. 4A, a transparent insulating substrate 210, such as the glass, is provided. A metal, such as Cu, Ti, Cr, Al, Mo, Ta or Al alloy is deposited by a sputtering method and patterned to form the gate line 201, the gate electrode 201a, the common line 204 and the first common electrode 206.

Figure 4B:
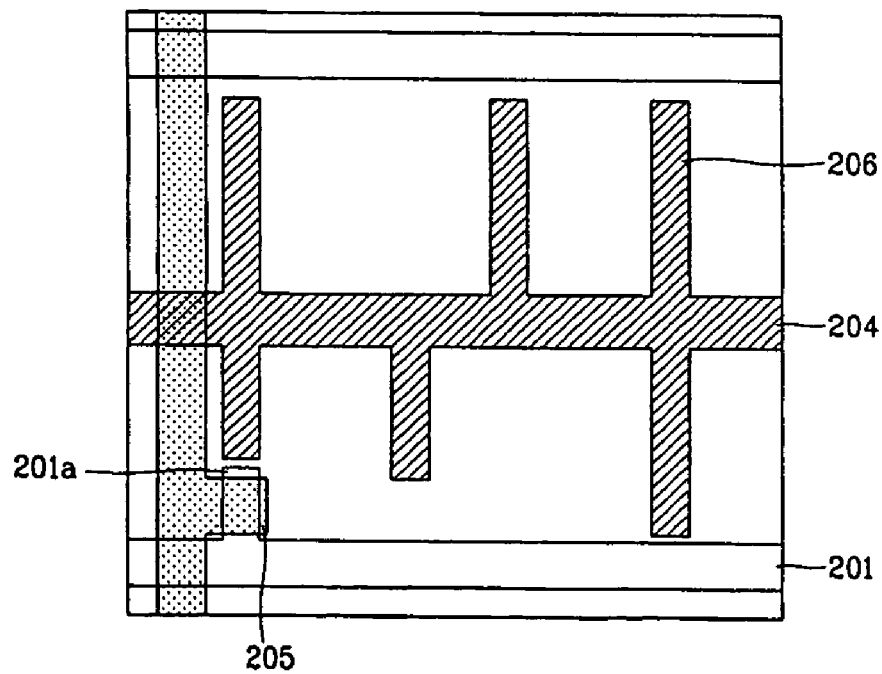

Next, as shown in FIG. 4B, $SiN_x$ or $SiO_x$ is deposited over the entire substrate using a plasma CVD method to form the gate insulating layer (not shown), and then, amorphous silicon and $n^+$ amorphous silicon are deposited thereon and patterned to form the semiconductor layer 205. The semiconductor 205 is also formed on a region on which the data lines will be formed in order to supply the data signal through the semiconductor layer 205 if an open is generated on the data line due to a defect in forming the data line.

Figure 4C:
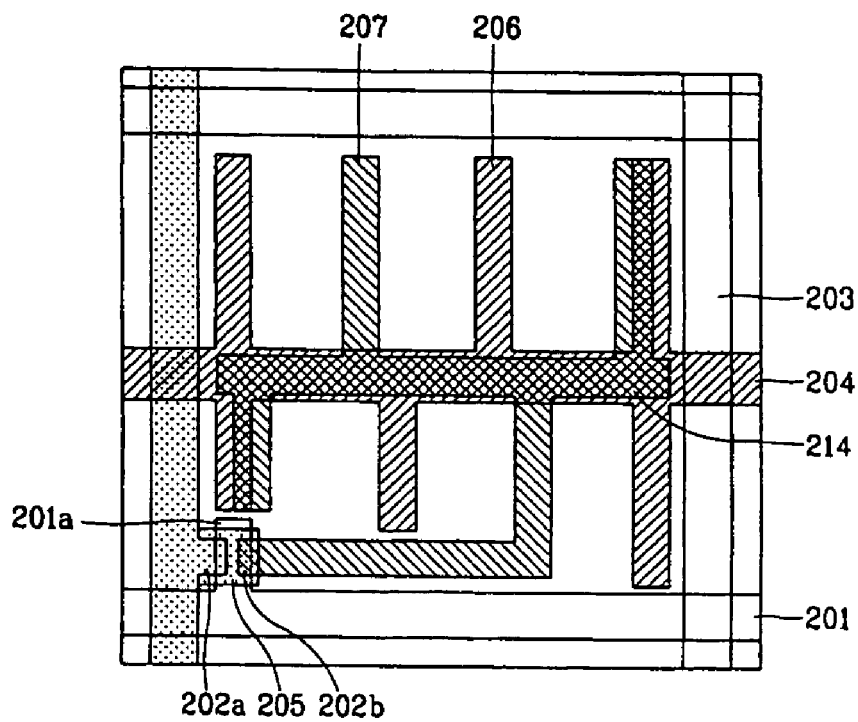

Next, as shown in FIG. 4C, a metal, such as Cu, Mo, Ta, Al, Cr, Ti or Al alloy, is deposited using a sputtering method and patterned to form the data line 203, the source electrode 202a and the drain electrode 202b, the pixel electrode 207 and the pixel electrode line 214 connected to the drain electrode 202b are formed on the semiconductor layer 205. The source electrode 202a and the drain electrode 202b are formed so that the semiconductor layer of amorphous silicon is exposed between the source electrode 202a and the drain electrode 202b.

Figure 4D:
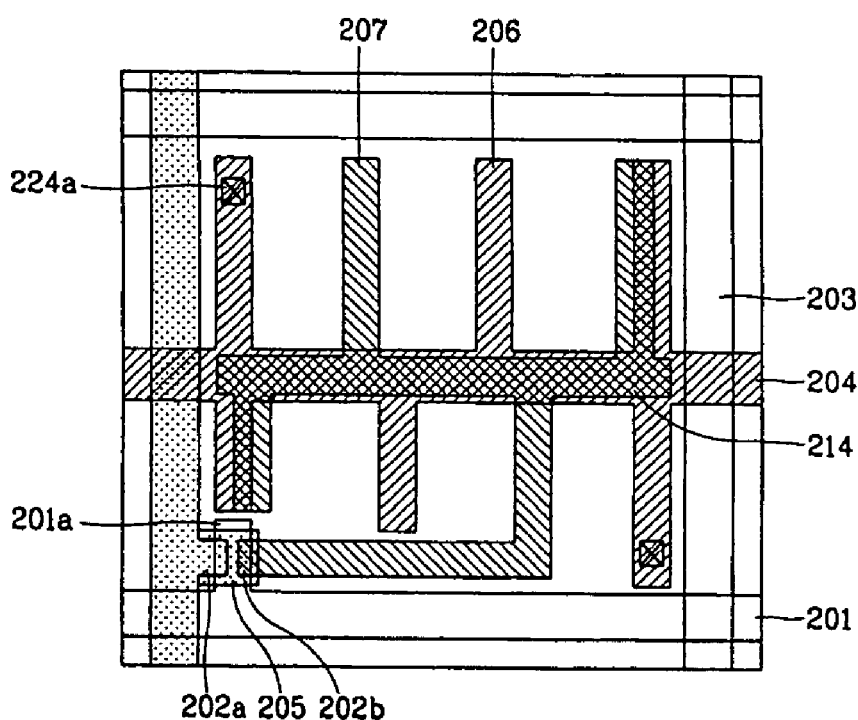

Then, as shown in FIG. 4D, the passivation layer (not shown) is formed over the entire upper surface including the pixel electrode 207. The passivation layer is formed by depositing inorganic material, such as SiOx or SiNx, or organic material, such as BCB or acryl. A part of the gate insulating layer and the passivation layer is etched to form the contact hole 224a to expose a part of the first common electrode 206 adjacent to the data lines 203.

Figure 4E:
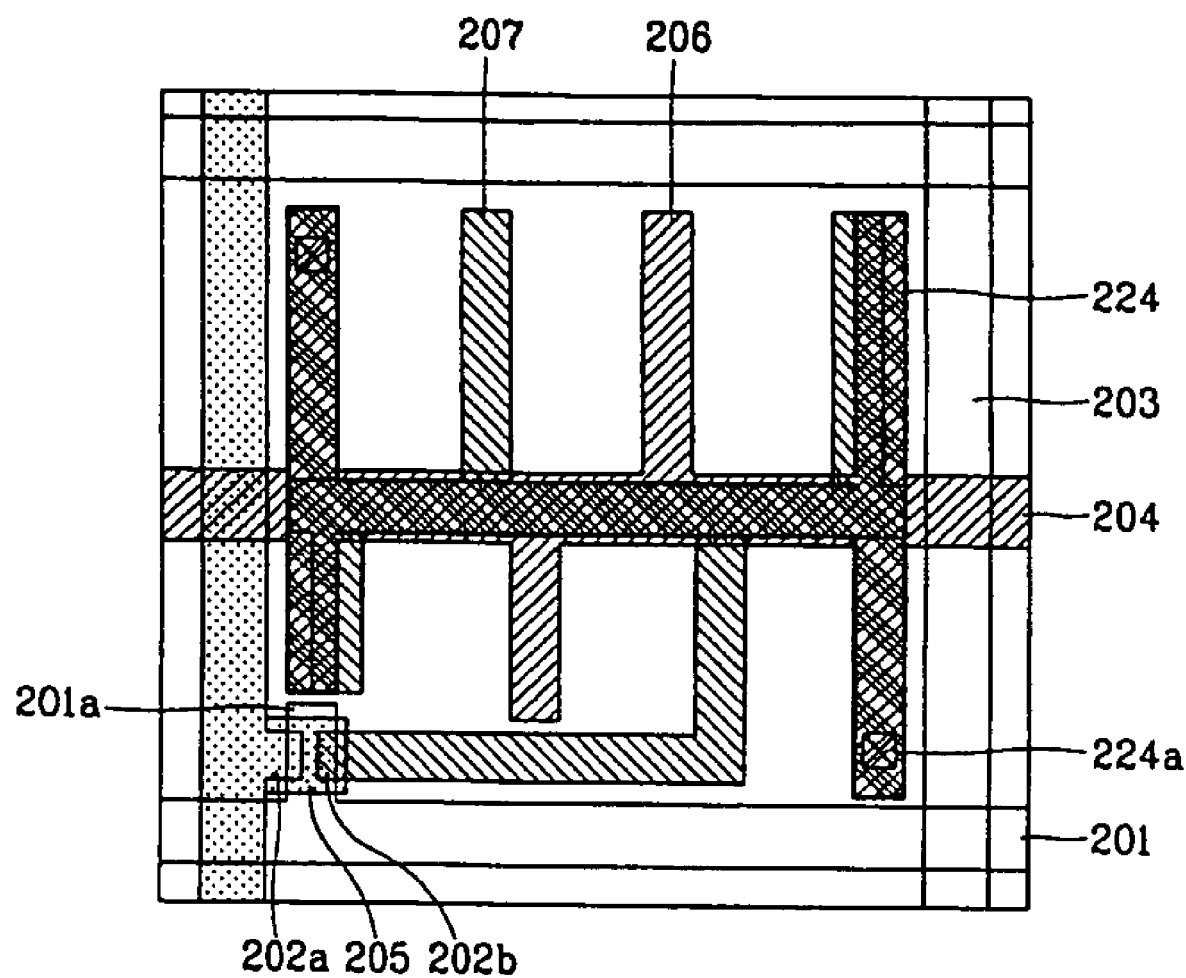

As shown in FIG. 4E, a transparent material, such as ITO or IZO, is deposited on the passivation layer using a sputtering method to connect to the first common electrode 206 through the contact hole 224a. The second common electrode 224 is then patterned to form an "H" shape overlapping the first common electrodes 206 and the pixel electrodes 207 adjacent to the data lines 203. Although it is not shown in FIG. 4E, the process of contacting with the gate/data pad units and the gate/data driver integrated circuits is also made during the formation of the second common electrode 224. As discussed above, the second common electrode 224 effectively shields the pixel electrode from the affects of the data voltage and increases the storage capacity of the storage capacitor to improve the reliability of the image quality. In addition, there is no need of additional process for forming the second common electrode since it can be done while contacting the gate/data pad units with the gate/data driver integrated circuits.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A fabrication method of an in-plane switching mode liquid crystal display device comprising:
    forming gate lines and data lines arranged in a matrix form on a first substrate to define a pixel area;
    forming a thin film transistor at a cross portion of the gate and data lines;

forming a common line and a pixel electrode line to divide the pixel area into an upper pixel area portion and a lower pixel area portion;

forming first common electrodes and pixel electrodes connected to the common line and the pixel electrode line;

forming a second common electrode disposed to overlap one of the first common electrodes and one of the pixel electrodes adjacent to the data lines, the second common electrode being connected to the one of first common electrode; and forming a liquid crystal layer between the first substrate and a second substrate.

2. The method of claim 1, wherein forming a common line and a pixel electrode line to divide the pixel area into the upper and lower pixel area portions includes forming an odd number of light transmission regions.

3. The method of claim 1, wherein forming a common line and a pixel electrode line to divide the pixel area into the upper and lower pixel area portions includes forming the upper and lower pixel area portions to each include a 3-block light transmission region.

4. The method of claim 1, further comprising forming a passivation layer between the first common electrodes and the second common electrode.

5. The method of claim 1, further comprising forming an insulating layer between the first common electrodes and the pixel electrodes.

6. The method of claim 1, wherein the common line and the first common electrodes are formed of an opaque metal.

7. The method of claim 6, wherein the opaque metal includes one of Cu, Ti, Cr, Mo, Ta, Al and Al alloy.

8. The method of claim 1, wherein the pixel electrode line and the pixel electrodes are formed of an opaque metal.

9. The method of claim 8, wherein the opaque metal includes one of Cu, Mo, Cr, Ti, Al and Al alloy.

10. The method of claim 1, wherein the second common electrode are formed of a transparent material.

11. The method of claim 10, wherein the transparent material includes one of indium tin oxide (ITO) and indium zinc oxide (IZO).

12. The method of claim 1, wherein forming the second common electrode includes patterning the second common electrode to have an "H" shape.

13. The method of claim 1, wherein forming the second common electrode includes connecting the second common electrode to the first common electrodes through a contact hole in the pixel area.

14. The method of claim 1, wherein forming the second common electrode includes connecting the second common electrode to the first common electrodes through a contact hole outside of the pixel area.

15. The method of claim 1, wherein forming the thin film transistor includes:
  forming a gate electrode on the first substrate;
  forming a gate insulating layer on the gate electrode;
  forming a semiconductor layer on the gate insulating layer;
  forming an ohmic contact layer on the semiconductor layer; and
  forming a source electrode and a drain electrode on the ohmic contact layer.

16. The method of claim 1, wherein forming the second common electrode includes forming the second common electrode to overlap the common line and the pixel electrode line.

17. The method of claim 1, wherein forming first common electrodes and pixel electrodes includes forming the first common electrodes and the pixel electrodes such that some of the pixel electrodes and some of the first common electrodes overlap each other in the upper and lower pixel area portions.

18. A fabrication method of an in-plane switching mode liquid crystal display device, comprising:
  forming gate lines and data lines in a matrix form on a first substrate to define a pixel area;
  forming a thin film transistor at a cross portion of the gate and data lines;
  forming a common line and a pixel electrode line to divide the pixel area into an upper pixel area portion and a lower pixel area portion;
  forming first common electrodes and pixel electrodes connected to the common line and the pixel electrode line, respectively;
  forming a passivation layer over the first substrate including the first common electrodes and the pixel electrodes, the passivation layer having a contact hole for exposing a part of the first common electrodes;
  forming a second common electrode in the shape of an "H" on the passivation layer, the second common electrode being connected to the first common electrodes through the contact hole and overlapped with the first common electrodes adjacent to the data lines; and
  forming a liquid crystal layer between the first substrate and a second substrate.

19. The method of claim 18, wherein forming the second common electrode includes connecting the second common electrode to the first common electrodes through a contact hole in the pixel area.

20. The method of claim 18, wherein forming the second common electrode includes connecting the second common electrode to the first common electrodes through a contact hole outside of the pixel area.

21. The method of claim 18, wherein forming first common electrodes and pixel electrodes includes forming the first common electrodes and the pixel electrodes such that some of the first common electrodes overlap each other in the upper and lower pixel area portions.

22. A fabrication method of an in-plane switching mode liquid crystal display device, comprising:
  forming gate lines and data lines arranged in a matrix form on the first substrate to define a pixel area;
  forming a thin film transistor at a cross portion of the gate and data lines;
  forming a common line and a pixel electrode line to divide the pixel area into an upper pixel area portion and a lower pixel area portion; and
  forming common electrodes and pixel electrodes connected to the common line and the pixel electrode line, wherein some of the pixel electrodes and some of the common electrodes overlap each other on one side of the pixel area in the upper pixel area portion and on another side of the pixel area in the lower pixel area portion.

* * * * *